United States Patent
Ozeri et al.

(10) Patent No.: US 6,655,321 B1
(45) Date of Patent: Dec. 2, 2003

(54) ADAPTER FOR CONVERTING AN ANIMAL ENCLOSURE INTO A SELF ENCASED PET CRATE

(76) Inventors: Moshe J. Ozeri, 23036 Burbank Blvd., Woodland Hills, CA (US) 91367;
Reuben Bahar, 23708 Welby Way, West Hills, CA (US) 91307

( * ) Notice: Subject to any disclaimer, the term of this patent is extended or adjusted under 35 U.S.C. 154(b) by 0 days.

(21) Appl. No.: 10/272,183

(22) Filed: Oct. 15, 2002

(51) Int. Cl.[7] .......................... A01K 1/03; A01K 31/06
(52) U.S. Cl. .......................... 119/452; 119/417
(58) Field of Search ............................ 119/416, 417, 119/452, 453, 461, 462, 463, 473, 474, 480, 496, 498, 499

(56) References Cited

U.S. PATENT DOCUMENTS

| | | | | |
|---|---|---|---|---|
| 4,314,410 A | * | 2/1982 | Nichols | 34/202 |
| 4,319,545 A | * | 3/1982 | Sou | 119/474 |
| 4,384,547 A | * | 5/1983 | Mattox | 119/464 |
| 4,471,720 A | * | 9/1984 | Hedeson et al. | 119/455 |
| 4,524,721 A | * | 6/1985 | Lanner et al. | 119/452 |
| 4,648,351 A | * | 3/1987 | Lanner et al. | 119/480 |
| 5,653,194 A | * | 8/1997 | Guy | 119/453 |
| 5,845,432 A | * | 12/1998 | Tully et al. | 43/61 |
| 6,029,609 A | * | 2/2000 | Bahar et al. | 119/474 |
| 6,192,834 B1 | * | 2/2001 | Kolozsvari | 119/498 |

* cited by examiner

*Primary Examiner*—Charles T. Jordan
*Assistant Examiner*—Judith A. Nelson

(57) ABSTRACT

An adapter for converting a foldable pet shelter into a self encased pet crate. The crate adapter has an end panel and a bottom panel, both of which may be joined together. The end panel is removably attachable to the foldable pet shelter along the back edge perimeter of the left side, right side, and top panels of the foldable pet shelter, while the bottom panel is removably attachable to the foldable pet shelter along the bottom edge perimeter of the left side, right side, and front side panels of the foldable pet shelter. Component lock elements positioned along various locations on the end and bottom panels of the adapter provide elements for removably securing the adapter to the foldable pet shelter, thereby converting the joined components into a self encased pet crate having a top panel, a right side panel, a left side panel, a front panel, a back panel, and a bottom panel.

15 Claims, 5 Drawing Sheets

ADAPTER FOR CONVERTING AN ANIMAL ENCLOSURE INTO A SELF ENCASED PET CRATE

BACKGROUND OF THE INVENTION

The field of the invention is pet shelters and the invention relates more particularly to pet/animal crates.

Animal cages or crates are commonly used by individuals as a means of restricting an animal's free movement to a particular premises. Although reasons for crating up an animal vary, there are significant advantages for doing so. For example, housetraining a new pet has long been a difficult and frustrating task for many pet owners. Despite the love that these owners have for their companions, they nevertheless face the problem of teaching their pet not to "go to the bathroom" inside of the residence. Additionally, new pets commonly tear up furniture and valuables inside of the home when someone is not available to control such mischievous behavior. As a result, use of a crate to train the pet has become quite common. Similarly, when traveling with a pet, crates are very useful throughout the course of the trip. They give the animal owner complete control over the pet in times where freedom can be dangerous for the pet and others around. Finally, crates have also been widely used to prevent an animal from coming into contact with other animals or humans. Often, an animal needs to be confined to a particular area simply because they do not interact well with others or due to their uncontrollable nature. As a consequence, use of a crate allows individuals to restrain their animal's aggressive or wild behavior and avoid difficult and harmful situations.

As described in U.S. Pat. No. 6,029,609, a "Foldable Pet Shelter" is one type of animal enclosure which is used for restricting an animal's free access throughout a residence. Unlike conventional crates, however, which typically have six panels that form a rectangular enclosure, the Foldable Pet Shelter does not have a second end or bottom panel. This is due to the unique design of the Foldable Pet Shelter which substitutes the surface of an exterior panel of a dwelling for the second end panel while the residence floor/ground is used for the bottom panel. By doing this, the Foldable Pet Shelter may be removably mounted to the surface of an exterior panel of a dwelling, around a pet door, so that a pet could enter the shelter with the ability to exit it upon desire. It is notable that the term "Foldable Pet Shelter", (hereinafter "FPS") is defined and understood herein and in all the claims to mean an animal/pet enclosure comprised of a top panel, right side panel, left side panel, and end panel that may be hingedly affixed to a surface of an exterior panel of a dwelling, such as that disclosed in U.S. Pat. No. 6,029,609.

BRIEF SUMMARY OF THE INVENTION

The present invention is for a crate adapter for converting an animal enclosure, such a foldable pet shelter, into a self encased pet/animal crate. The crate adapter has an end panel and bottom panel, both of which may be hingedly joined together. The end panel is removably attachable to the animal enclosure along the back edge perimeter of the left side, right side, and top panels of the animal enclosure, while the bottom panel is removably attachable to the animal enclosure along the bottom edge perimeter of the left side, right side, and front panels of the animal enclosure. When joined together, both the adapter and animal enclosure transform into a self encased, self supporting pet/animal crate which is useful for housetraining a pet as well as restricting its movement within a particular area.

Component lock elements attached along the end and bottom panels of the adapter provide elements for securing the adapter to the animal enclosure. Hinges joining the end and bottom panels of the adapter may further allow both panels to be folded along a vertical plane towards one another. This provides for a convenient and compact formation for storing the adapter when it is not in use with the animal enclosure.

DETAILED DESCRIPTION OF THE PREFERRED EMBODIMENTS

Figure 1:
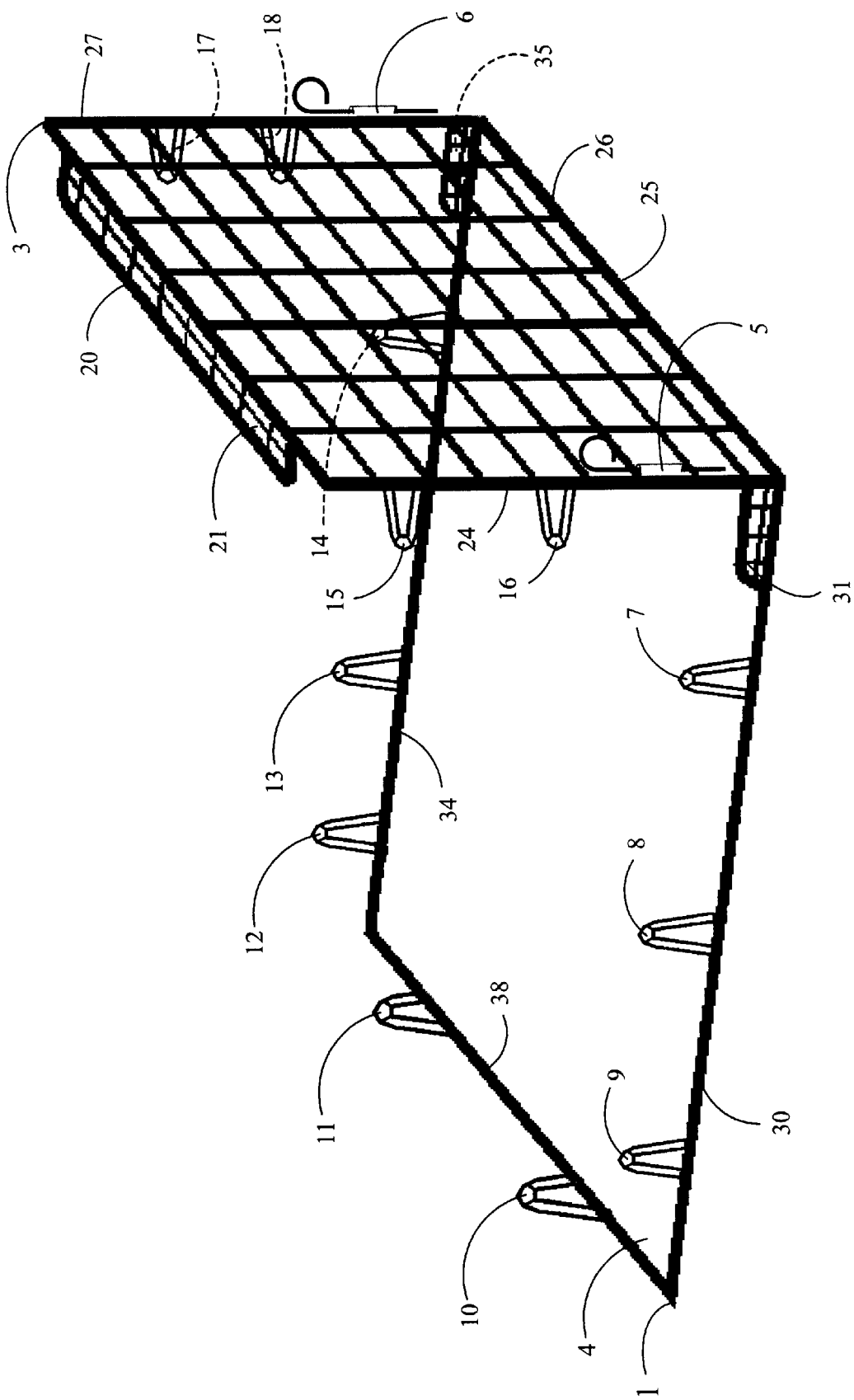
FIG. 1 is a perspective view of one embodiment of the crate adapter illustrating an end panel attached to a bottom panel and containing component lock clips and pins for securing the adapter to a foldable pet shelter.

As shown in FIG. 1, the crate adapter 1, has an end panel 3 and a bottom panel 4 perpendicularly positioned next to each other so that the bottom edge 26 of end panel 3 abuts the back edge 25 of bottom panel 4. Crate adapter 1 further has component lock pins 5 and 6 vertically attached to end panel 3 along right side edge 24 and left side edge 27. Along the perimeter of bottom panel 4, component lock clips, reference characters 7–14 are shown in an unlocked open position in a similar manner to component lock clips 15–18 which are respectively located along right side edge 24 and left side edge 27 of end panel 3. Both the component lock pins 5 and 6 as well as component lock clips 7–18 provide elements which removably secure a FPS to the adapter 1 when both components are joined together.

Figure 2:
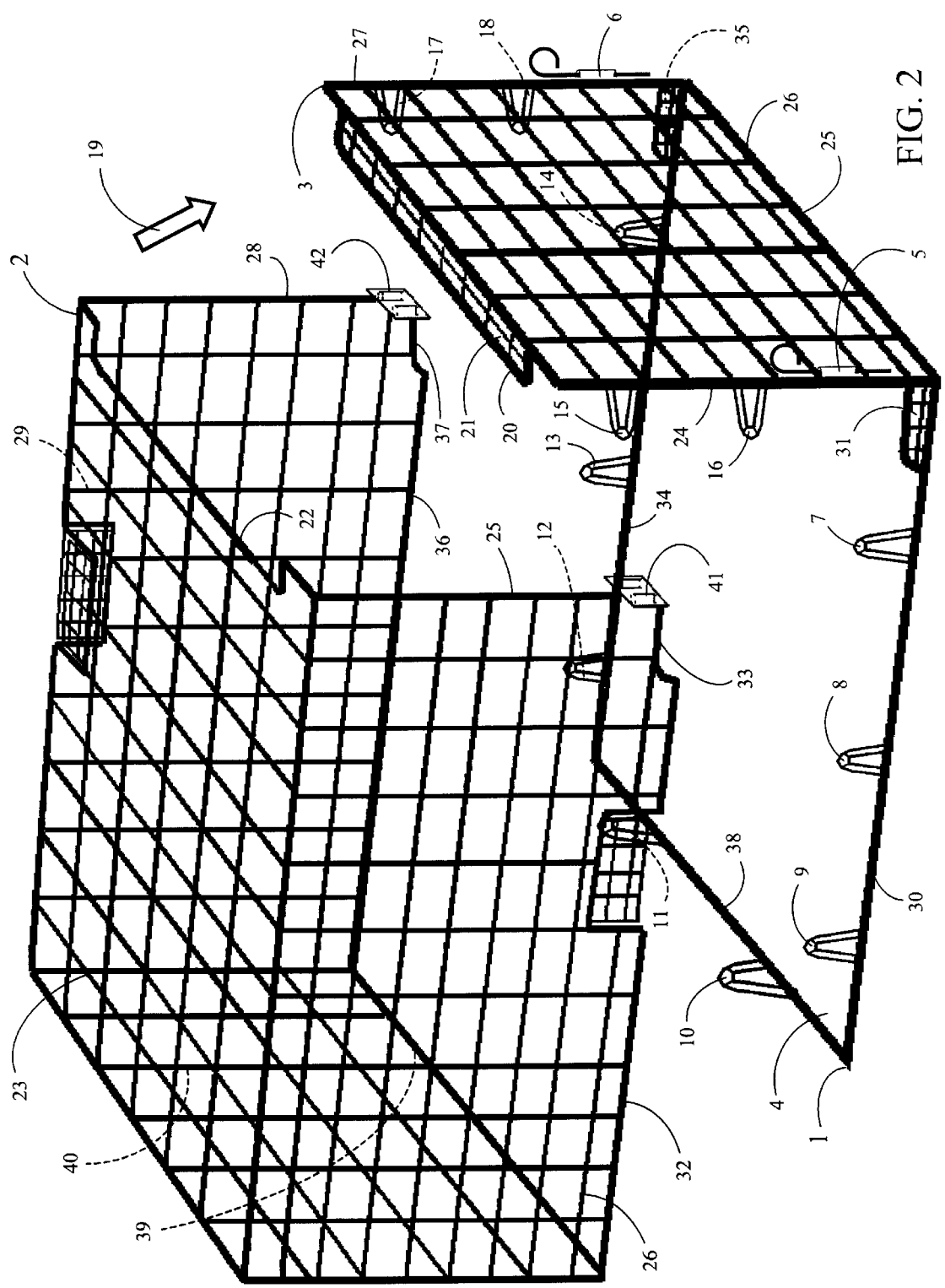
FIG. 2 is a perspective view of one embodiment for attaching the adapter to foldable pet shelter whereby the foldable pet shelter is lowered onto the adapter in order to convert the two components into a self encased pet/animal crate.
Figure 3:
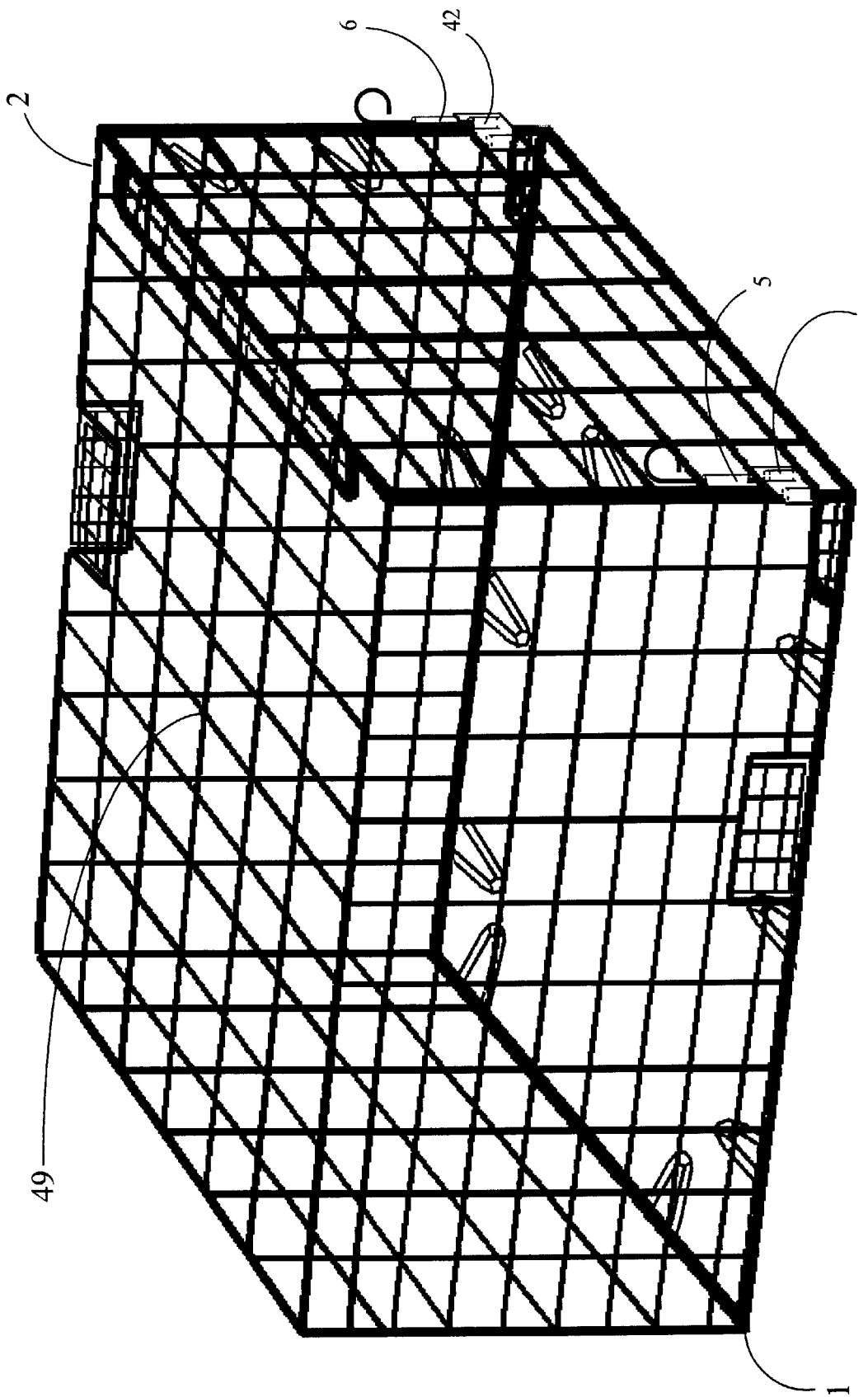
FIG. 3 is a perspective view of a self encased crate resulting from having secured the adapter to a Foldable Pet Shelter.

As indicated by arrow 19 in FIG. 2, a FPS 2 may be joined together with the crate adapter 1 to form a self encased pet crate 49 (as shown in FIG. 3). Upper edge 20 of the adapter end panel 3 is brought together in an abutting manner to the back edge 22 of the top panel 23 of the FPS 2. As shown in the diagram (FIG. 2), upper edge 20 of end panel 3 runs along an extended frame member portion 21 of end panel 3 that is horizontally situated parallel to bottom panel 4. It is noteworthy that extended frame member portion 21 is just one example of how an extending frame member built into either of the adapter panel(s) 3 or 4 may be used to complete the less then rectangular form of particular panel(s) of the FPS 2. For example, the elongated "u" shaped void that is located at the back edge 22 of FPS top panel 23 is compensated with the extended frame member portion 21 of end panel 3 when the FPS 2 and the adapter 1 are joined together. Of course, end panel 3 need not have extended frame member portion 21 for the adapter 1 to effectively transform the FPS 2 into a self encased pet crate, although such may be preferred in order to accommodate the top panel 23 design of the FPS 2.

Attachment of the adapter 1 to the FPS 2 further requires that the right side edge 24 of adapter end panel 3 be positioned in an abutting manner to the back edge 25 of the Foldable Pet Shelter's right side panel 26. Similarly, left side edge 27 of the adapter end panel 3 would abut the back edge 28 of the Foldable Pet Shelter's left side panel 29. With respect to the bottom panel 4 of the adapter 1, attachment would render the right side edge 30 of bottom panel 4 abutting the bottom edge 32 of the foldable pet shelter's right side panel 26. Likewise, left side edge 34 of bottom panel 4 would abut the bottom edge 36 of the foldable pet shelter's left side panel 29. It should be mentioned that similar to the extended frame member portion 21 of end panel 3, the adapter 1 may also contain extended frame member portion(s) 31 and 35 respectively. Frame member portions 31 and 35 are further examples of how an extending frame member may be built into either panels 3 or 4 of the adapter 1 for the purpose of completing the less then rectangular form of particular panel(s) of the FPS 2. As shown in FIG. 2, both the right 26 and left 29 side panels of the FPS 2 contain a curvature void, 33 and 37 respectively. Although extended frame member portions 31 and 35 need not be present for the adapter 1 to effectively transform the FPS 2 into a self encased pet crate, such may be preferred in order to accommodate the right 26 and left 29 side panel designs of the FPS 2. Finally, attachment of the adapter 1 to the FPS 2 would render the front edge 38 of the adapter bottom panel 4 abutting the bottom edge 39 of the Foldable Pet Shelter's front panel 40.

Once the FPS 2 is attached to the crate adapter 1 (in the manner mentioned above), the two components may be removably secured together in a number of different ways. For example, component lock pins 5 and 6 which are vertically mounted on the outer surface of end panel 3 may be inserted into pin sleeves 41 and 42, located on the lower bottom portions of the right 26 and left 29 side panels of the FPS 2. Additionally, component lock clips 7–14 may be used to clamp the bottom panel 4 of the adapter 1 to the FPS 2 along the bottom edge perimeter 32 of the FPS right panel 26, the bottom edge perimeter 36 of the FPS left panel 29, and the bottom edge perimeter 39 of the FPS front panel 40. Furthermore, component lock clips 15–18 may be used to clamp the end panel 3 of the adapter 1 to the FPS 2 along the back edge 25 of the FPS right side panel 26 and along the back edge 28 of the FPS left side panel 29. As shown in FIG. 3, the adapter 1 and FPS 2 have been secured together, in the manner discussed above, to form a self encased pet crate 49.

Figure 4:
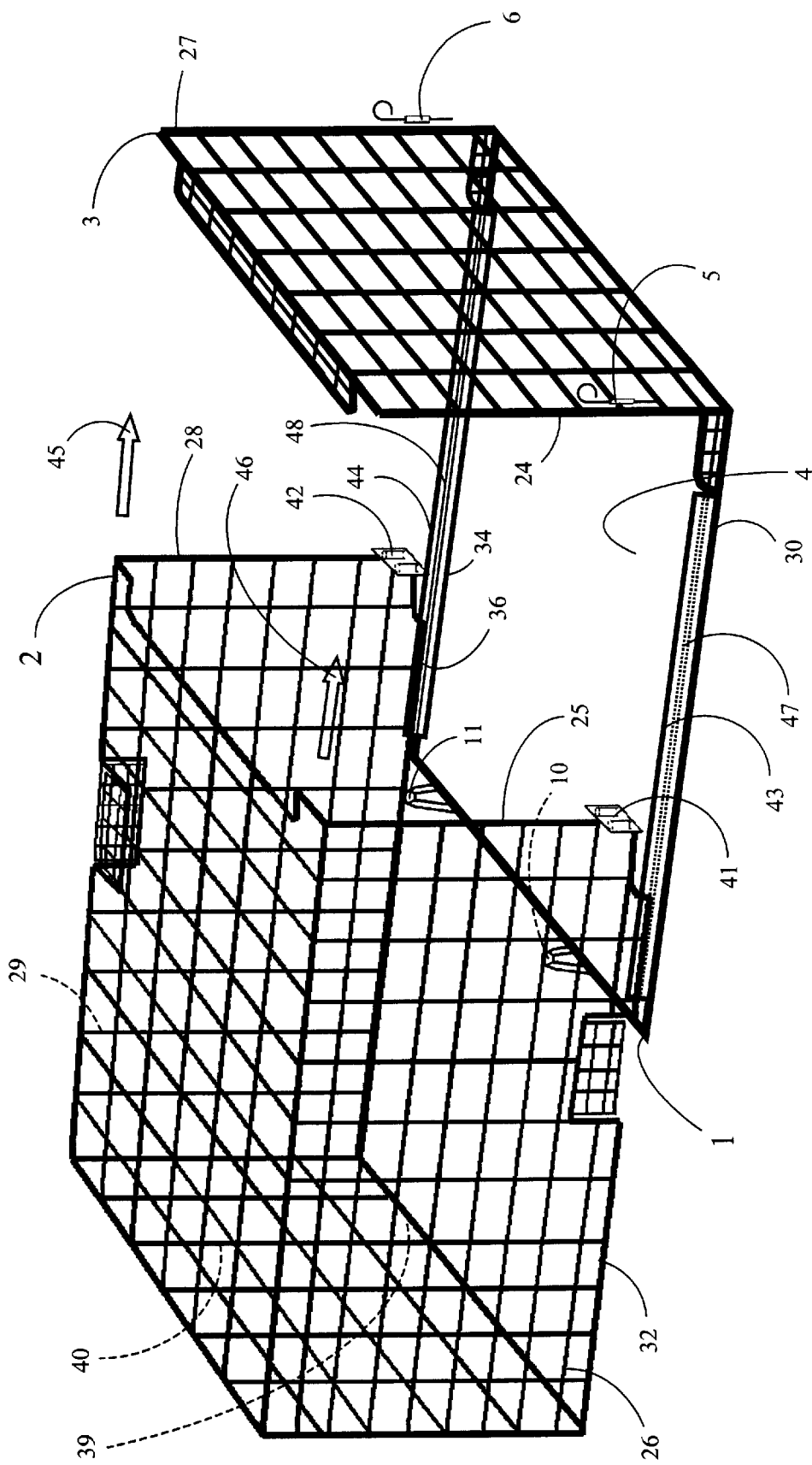
FIG. 4 is a perspective view of another embodiment for attaching the adapter to a foldable pet shelter whereby the foldable pet shelter is slid into sliding tracks that are mounted on the bottom panel of the adapter in order to convert the two components into a self encased pet/animal crate.

Alternatively, FIG. 4 illustrates another example of how the adapter 1 can be secured to the FPS 2. As shown, the adapter 1 is equipped with sliding tracks 43 and 44 respectively mounted on the right 30 and left 34 side edges of the adapter bottom panel 4. Indicated by direction arrows 45 and 46, the bottom edge 32 of the FPS right side panel 26 and the bottom edge 36 of the FPS left side panel 29 are inserted into the right 47 and left 48 channel grooves of right and left sliding tracks 43 and 44 respectively. The FPS 2 is thereafter advanced along tracks 43 and 44 towards the end panel 3 of the adapter 1 until: i. the back edge 25 of the FPS right side panel 26 abuts the right side edge 24 of adapter end panel 3, and ii. the back edge 28 of the FPS left side panel 29 abuts the left side edge 27 of adapter end panel 3. Thereafter, component lock pins 5 and 6 may be inserted into pin sleeves 41 and 42 respectively, while component lock clips 10 and 11 may be clamped upon the bottom edge 39 of the FPS front panel 40 in order to secure the FPS 2 to the adapter 1. It is noteworthy that despite the two mentioned examples for securing the adapter 1 to the FPS 2, it is, of course, understood that there are numerous other methods for securing the two components together which are best known to those skilled in the art, and therefore, need not be mentioned herein. Additionally, although the "tilting" component clips 7–18 are shown as the elements which removably secure the adapter 1 to the FPS 2, other securing devices, including, but not limited to metal or plastic snap clips, latch and eye arrangement(s), or other type of locking device(s), dependent or independent of the adapter 1, may be used to secure the adapter 1 to the FPS 2.

Both the end 3 and bottom 4 panels of the adapter 1 can be made from a total or partially closed sheet of plastic, metal, wood, fiberglass, or other material, but are preferably made from a wire grid to further provide ventilation for the animal and less of an enclosed feeling inside the crate 49. Additionally, although end 3 and bottom 4 panels are shown to be in a substantially flat, rectangular formation, they may alternatively undertake any geometric shape, including, but not limited to spherical, triangular, trapezoid, polygon, etc. Finally, it is noteworthy that the bottom panel 4 of the adapter 1 may allow for a plastic/metal pan to be removably attached to its upper surface area so that an animal/pet may have added resting comfort when placed inside the crate 49. The plastic pan may even be the bottom panel 4, thereby eliminating the need to place a grid or similar panel member underneath the pan.

Figure 5:
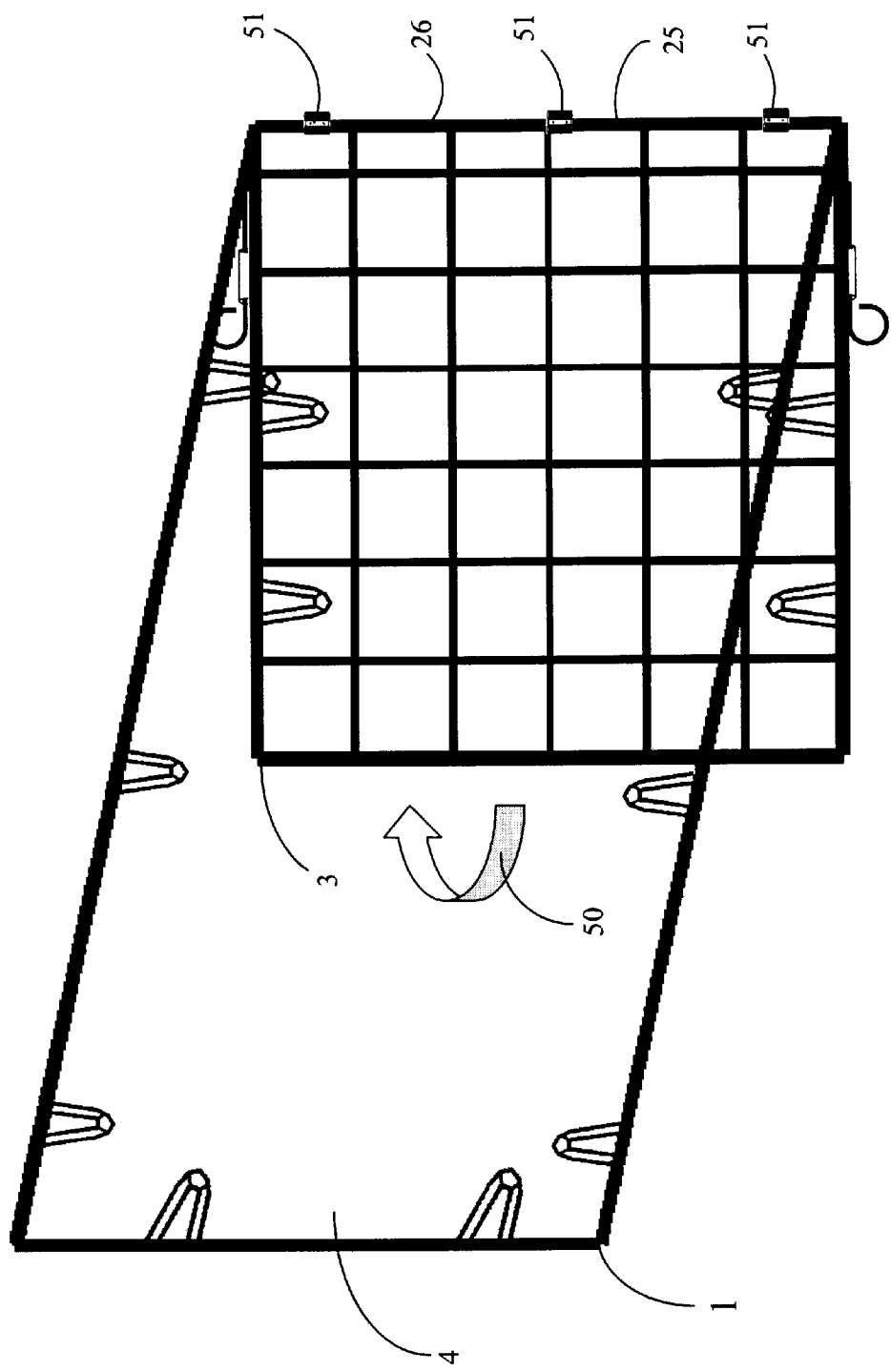
FIG. 5 is a perspective view of the adapter of FIG. 1 in a tilted position for illustrating the process by which the end panel may be folded flush atop of the bottom panel.

Panels 3 and 4 of the adapter 1 are preferably hingedly attached along the bottom edge 26 of end panel 3 and back edge 25 of bottom panel 4. Illustrated in FIG. 5, a hinge 51 joining these two panels together will maintain the stability and unification of the adapter 1. Hingedly joining the panels together will also provide for a precise and guided process of folding the panels along a parallel plane towards one another. As indicated by arrow 50, FIG. 5, adapter end panel 3 is rotated vertically along the hinged axis from which the panels are attached towards a position that places it flush on adapter bottom panel 4. Folding the panels 3, 4 in this manner allows the adapter 1 to be rendered in a compact and flat formation for storage and transportation during times of non-use. Of course, adapter panels 3 and 4 may alternatively be detached from each other and exist as separate components, each of which, can be independently attached to the FPS 2.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. An adapter for converting an animal enclosure comprising a top panel right side panel left side panel, and end panel into an encased animal crate having a top panel, right side panel, left side panel, bottom panel, and two end panels, said adapter comprising:

an end panel removably attachable along a back edge perimeter of said animal enclosure, said back edge perimeter being formed from the back edges of said right side, left side, and top panels of said animal enclosure;

a bottom panel removably attachable along a bottom edge perimeter of said animal enclosure, said bottom edge perimeter being formed from the bottom edges of said right side, left side, and front side panels of said animal enclosure.

2. The adapter of claim 1, wherein said adapter end panel is hingedly affixed to said adapter bottom panel.

3. The adapter of claim 1, further including elements which removably secure said adapter to said animal enclosure.

4. The adapter of claim 3, wherein said elements are situated on said adapter.

5. The adapter of claim 3, wherein said elements are attachable to said adapter, said animal enclosure, or a combination thereof.

6. The adapter of claim 1, wherein said adapter end and bottom panels may be rotated along the axis from which they are hingedly attached in order to fold said panels flush on top of each other.

7. The adapter of claim 1, wherein said animal enclosure is a foldable pet shelter.

8. An adapter for converting a foldable pet shelter into an encased animal crate having a top panel, right side panel, left side panel, bottom panel, and two end panels, said adapter comprising:

an end panel removably attachable along a back edge perimeter of said foldable pet shelter, said back edge perimeter being formed from the back edges of said right side, left side, and top panels of said foldable pet shelter;

a bottom panel removably attachable along a bottom edge perimeter of said foldable pet shelter, said bottom edge perimeter being formed from the bottom edges of said right side, left side, and front side panels of said foldable pet shelter.

9. The adapter of claim 1, wherein said adapter end panel is hingedly affixed to said adapter bottom panel.

10. The adapter of claim 1, further including elements which removably secure said adapter to said foldable pet shelter.

11. The adapter of claim 10, wherein said elements are situated on said adapter.

12. The adapter of claim 10, wherein said elements are attachable to said adapter, said foldable pet shelter, or a combination thereof.

13. The adapter of claim 1, wherein said adapter end and bottom panels may be rotated along the axis from which they are hingedly attached in order to fold said panels flush on top of each other.

14. A method for converting an animal enclosure comprising a top panel, right side panel, left side panel, and end panel into an encased animal crate having a top panel, right side panel, left side panel, bottom panel, and two end panels, said method comprising:

providing an end panel having left, right, and top edges; and attaching said end panel to said animal enclosure along said right, left, and top edges, or a combination thereof, of said end panel, wherein said end panel is attached to said enclosure at a back edge perimeter of said enclosure, said back edge perimeter being formed from the back edges of said right side, left side, and top panels of said animal enclosure;

providing a bottom panel having right, left, front, and back edges; and attaching said bottom panel to said animal enclosure along said right, left, and front edges, or a combination thereof, of said bottom panel, wherein said bottom panel is attached to said enclosure at a bottom edge perimeter of said enclosure, said bottom edge perimeter being formed from the bottom edges of said right side, left side, and front panels of said animal enclosure.

15. The method of claim 14, wherein said animal enclosure is a foldable pet shelter.

* * * * *

UNITED STATES PATENT AND TRADEMARK OFFICE
CERTIFICATE OF CORRECTION

PATENT NO.    : 6,655,321 B1
DATED         : December 2, 2003
INVENTOR(S)   : Ozeri et al.

It is certified that error appears in the above-identified patent and that said Letters Patent is hereby corrected as shown below:

Column 5,
Lines 34 and 36, for the claim reference numeral "1", each occurrence should read -- 8 -- instead.

Column 6,
Line 6, for the claim reference numeral "1", each occurrence should read -- 8 -- instead.

Signed and Sealed this

Fifteenth Day of February, 2005

JON W. DUDAS
*Director of the United States Patent and Trademark Office*